United States Patent [19]

Galiatsatos et al.

[11] Patent Number: 5,376,738

[45] Date of Patent: Dec. 27, 1994

[54] POLYMERIC NETWORKS OF POLYSILOXANE WITH INCREASED MODULUS

[75] Inventors: Vassilios Galiatsatos, Akron, Ohio; P. R. Subramanian, Charlotte, N.C.

[73] Assignee: The University of Akron, Akron, Ohio

[21] Appl. No.: 125,477

[22] Filed: Sep. 22, 1993

[51] Int. Cl.⁵ .............................................. C08G 77/06
[52] U.S. Cl. ........................................ 525/477; 528/34
[58] Field of Search ............................ 528/34; 525/477

[56] References Cited

U.S. PATENT DOCUMENTS

| | | | |
|---|---|---|---|
| 3,676,420 | 7/1972 | Fulton et al. | 528/18 |
| 3,845,161 | 10/1974 | Beers | 528/33 |
| 3,925,277 | 12/1975 | Lampe | 528/34 |
| 3,985,830 | 10/1976 | Fetters et al. | 260/880 B |
| 4,124,560 | 11/1978 | Hezig | 260/37 SB |
| 4,257,932 | 3/1981 | Beers | 528/18 |
| 4,434,283 | 2/1984 | Sattlegger et al. | 528/34 |
| 4,461,854 | 7/1984 | Smith | 523/211 |
| 4,534,928 | 8/1985 | Martin | 264/334 |
| 4,591,622 | 5/1986 | Blizzard et al. | 525/477 |
| 4,681,714 | 7/1987 | Lopes et al. | 264/46.6 |
| 4,889,770 | 12/1989 | Ona et al. | 428/447 |
| 4,929,703 | 5/1990 | Narula et al. | 528/23 |
| 4,960,847 | 10/1990 | Arai et al. | 528/32 |
| 5,126,171 | 6/1992 | Katsuno et al. | 427/387 |
| 5,260,348 | 11/1993 | Shepherd et al. | 522/25 |

*Primary Examiner*—Ralph H. Dean
*Assistant Examiner*—Margaret W. Glass
*Attorney, Agent, or Firm*—Hudak & Shunk Co.

[57] ABSTRACT

Disclosed is a method for making polyorganosiloxane networks (preferably polydimethylsiloxane) with controlled heterogeneity of the molecular weight between crosslinks. Low molecular weight functionally terminated polyorganosiloxanes are reacted with a polyfunctional crosslinking agent to form a product of molecular weight from about 1.33 to 15 times that of the starting materials. These partially crosslinked chains are then reacted with more crosslinking agents and functionally terminated polyorganosiloxanes of 20–40 times higher molecular weight. The molecular weight achieved In the first reaction has an effect on properties such as modulus, birefringence, and stress optical coefficient. The low molecular weight chains in this form serve to increase modulus and durability while keeping optical clarity of the inherently soft networks.

16 Claims, 8 Drawing Sheets

POLYMERIC NETWORKS OF POLYSILOXANE WITH INCREASED MODULUS

FIELD OF INVENTION

Compositions of matter made from blends of silanol terminated polysiloxane polymers of bimodal molecular weight distributions are disclosed. These are desirably transparent and have non-linear stress optical properties. They are between 85 and 95 mole percent short chains. The ratio of the molecular weight of the long chains to the short chains is from about 20 to 40. These networks have increased modulus due to prereacting the short polymer chains with a polyfunctional crosslinking agent having a functionality from about 3 to about 4 prior to adding said long chain polysiloxanes. The length of time this prereaction occurs is called the heterogeneity time.

BACKGROUND

Polysiloxane polymer networks are well known, including networks made from silanol terminated polysiloxanes where the network is made with polymers having a bimodal distribution of molecular weights. Silanol terminated polysiloxanes of different molecular weights can be crosslinked with tetramethyl orthosilicate. One problem with these networks are their low modulus. The modulus can be increased by adding reinforcing fillers such as fumed silica, but the resulting polysiloxane networks are not transparent.

It is the object of this invention to make bimodal polysiloxane networks of higher modulus without resorting to adding proportionately more short chain polysiloxanes and without adding reinforcing silica fillers.

SUMMARY OF THE INVENTION

The modulus of bimodal polysiloxane polymer networks made from functionally terminated polymers can be increased by prereacting the low molecular weight silanol terminated polysiloxane chains with a polyfunctional crosslinking agent such as tetraethyl orthosilicate and a catalyst prior to adding the higher molecular weight polysiloxane chains. These reactions are conducted with generally stoichiometric ratios of the functional end groups of the low molecular weight chains and the functional groups of the crosslinking agents. The length of time the low molecular polysiloxane chains are prereacted with the polyfunctional crosslinking agent (heterogeneity time) determines the heterogeneity of the molecular weight between crosslinks in the final composition. The modulus of the polymer network is increased by increasing the heterogeneity time. Subsequent to the heterogeneity period, the higher molecular weight polysiloxane along with additional polyfunctional crosslinking agents are added and allowed to react under appropriate conditions to form a crosslinked polymer network.

DETAILED DESCRIPTION OF THE INVENTION

This invention relates to a process for making polysiloxane polymer networks with enhanced modulus due to the order of adding and reacting the components to the composition. The polysiloxane polymer networks are comprised of at least two different molecular weight polysiloxane chains and at least one crosslinking agent. Depending on the reaction conditions, one or more catalysts that catalyze the reaction between the polymer chains and the crosslinking agents may be useful. The first or short chain polysiloxane are desirably from about 1/20 to about 1/40 of the molecular weight of the second or higher molecular weight polysiloxane chains. The mole ratio of short chains to high molecular weight chains is desirably from about 80:20 to 96:4, more desirably from about 85:15 to 95:5, and preferably from about 87:13 to 93:7.

Desirably, the short polysiloxane chains are reacted in solution with a stoichiometric equivalence of functional groups from a crosslinking agent for a period of time (called the heterogeneity time) and then the high molecular weight polysiloxane chains along with their stoichiometric equivalence of functional groups from a crosslinking agent are added to the short chains. The prereaction time of the short chains with the crosslinking creates clusters of short polymer chains chemically bonded with the crosslinking agents having a number average molecular weights from about 1.33 to 15 times the original number average molecular weight of the solution of crosslinking agents and polymer chains. Desirably, this factor is from about 2 to about 10, and preferably from about 3 to about 8. These changes in molecular weight can be correlated with the fractional reaction of reactive groups and the average functionality of each molecule. With difunctional molecules, the average molecular weight can be estimated to be the average molecular weight of the difunctional molecule divided by the quantity 1 minus the mole fraction of functional groups reacted $(Mn) = Mo \times (1/(1-p))$. With molecules having higher functionality per molecule, the number average molecular weight is $Mo \times (2/(2-p \cdot favg))$ where Mo is the average molecular weight of the molecules, p = fraction of function groups rejected, and favg is the average functionality per molecule.

The heterogeneity time can vary between 0 minutes and the gel time for the composition. Neither of the two extreme times are claimed herein. Rather, the heterogeneity time is desirably from about 10 to about 90% of the gel time, more desirably from about 15 to about 80% of the gel time, and preferably from about 20 to 60% of the gel time for the short polymer chains, crosslinking agent, and optional catalyst under the reaction conditions (such as temperature) of the heterogeneity time.

The polysiloxanes of this invention may be those of the repeat unit $$\left( \begin{array}{c} R^1 \\ | \\ -O-Si- \\ | \\ R^2 \end{array} \right)$$

wherein $R^1$ and $R^2$ can individually be on each separate repeat unit an alkyl having from 1 to 6 carbon atoms or phenyl, desirably alkyls of 1 to 4 carbon atoms or phenyl, and preferably methyl, ethyl or phenyl. The preferred polysiloxanes are polydimethylsiloxane and copolymers of dimethylsiloxane with methyl-phenyl siloxane. Optionally, one or more of the $R^1$ or $R^2$ groups can be a mesogenic side chain of as explained in Makromol. Chem. Rapid Commun. 1 pp 31–34, 1980.

Optionally, the above described mesogenic groups can be present as a block in the polysiloxane polymer chains of this invention to give crystalline regions in the chains.

The polysiloxanes desirably have two or more functional end groups. The functional end groups may be hydrogen; hydroxyl; alkoxy groups where the alkyl portion has 1 to 4 carbon atoms; amine groups such as $NR^3R^4$ where $R^3$ and $R^4$ are individually H, alkyl groups having 1 to 4 carbon atoms, phenyl groups, cyclohexyl groups; or $-O-N=CR^5R^6$ where $R^5$ and $R^6$ are alkyl groups having from 1 to 4 carbon atoms. Desirably, the polysiloxane polymers have an average of 2 functional groups per polymer.

The short chain polysiloxanes may have number average molecular weights from about 200 to about 1000, desirably from about 250 to about 800, and preferably from about 250 to about 500. The high molecular weight chains may have a number average molecular weight from about 4,000 to about 60,000; desirably from about 5,000 to about 32,000; and preferably from about 18,000 to about 28,000. Desirably, the polydispersity of the molecular weight distributions are 3 or less, and preferably 2.5 or less.

The crosslinking agent needs to have an average functionality from 2 to 6 with the functional groups reactive under the crosslinking conditions with the functional group of the polysiloxane polymer chains. The crosslinking agent may be silanes of the formula: $R_{4-n}{}^{10} Si(OR^{11})_n$ wherein each $R^{10}$ and $R^{11}$ within the crosslinking linking agent can be an alkyl of 1 to 6 carbon atoms or phenyl, desirably from 1 to 3 carbon atoms, and n can be any integer from 2 to 4; or $(R^{11}N)_3SiR^{10}$, $R_2{}^{10} Si-(NR_2{}^{11})_2$, $R^{10}-Si (HC=CH_2) (NR_2{}^{11})_2$; $(R^{11})_2-C=N-O)_3 Si-R^{10}$; $(R_2{}^{11}C=N-O)_3 Si-$ $-CH=CH_2$; $R_2{}^{11} (H) Si-O-Si (H) R_2{}^{11}$; a cyclic $-(OSi(H)R^{11})_3-$ or $(R^{11}-Si(H)-O-)_z$ where z can be from 3 to 100, preferably 3, 4, 5, and $R^{10}$ and $R^{11}$ can individually be the different alkyl groups within each crosslinking agent described above. It is required that at least one crosslinking agent within the composition have a functionality above 2 so that the average functionality of the crosslinking agent is above 2.

The catalysts may be any of the catalysts known to the art for forming polysiloxane polymer networks by condensation reactions. Preferred catalysts are salts of alkylates and tin or zinc where the alkylate groups have from 1 to 20 carbon atoms and desirably from 4–12 carbon atoms, optionally with unsaturation therein. Preferred catalysts are stannous octoate and zinc octoate.

The polysiloxane networks may optionally contain small amounts of other molecular weight polysiloxanes such as silicone oil plasticizers with 0 or 1 functional end groups in amounts up to 10 wt % but are desirably free thereof. The networks may contain U.V. protecting agents or other stabilizers against degradation from environmental factors. Fillers may be included in the composition if optical clarity is not required. These may be silicates, titanium based oxides, aluminum based oxides, silica (especially fumed silica) and traditional numeral fillers.

The crosslinking agents, functional groups of the polysiloxane chains and catalysts are reacted together at temperatures from about 0° to 150° C., desirably 10 to 130° C.; and preferably from 20° to 100° C. to form the chain clusters and polymer networks. It is understood that stoichiometric equivalence is desired as an optimal reaction condition, but this invention can be practiced with the equivalents imbalanced by up to 50%, preferably up to 20%, during pre-network reactions. During the final reaction where the network is forming, the equivalents can be imbalanced by as much as 20%, desirably as much as 10%.

These networks may contain some polymer chains which are only bound into the polymer network at one end. They may also contain unbound polymer chains known as the sol fraction of the network. During the evaluation of polymer samples in the Example portion of this application, the sol fraction was removed. It is understood that the polymer network is a generic term that may include or exclude the sol fraction.

The birefringence of these polymeric networks can be controlled by the mole ratio of short chains to long chains and by the heterogeneity time. This gives more control over the birefringence than found in more traditional bimodal molecular weight between crosslink polysiloxane networks. Hypothetically, the birefringence may be different between in plane and out of plane measurements. The short chains in the network will help control the lower limit for the stress optical coefficient while the high molecular weight chains help control the upper limit for the stress optical coefficient.

Figure 6:
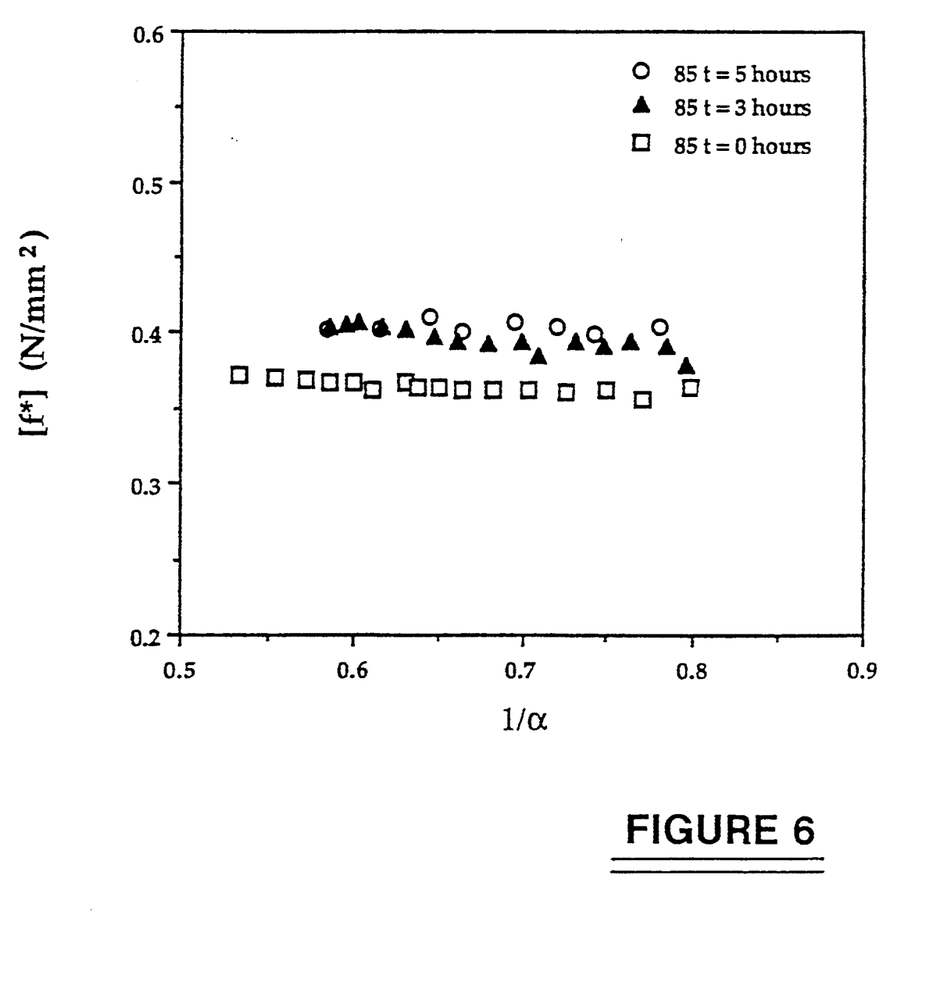
FIG. 6 shows a Mooney-Rivlin representation for a PDMS network prepared as explained above for FIG. 3 with 85 mol % short chains having heterogeneity times of 0, 3, and 5 hours, respectively.
Figure 8:
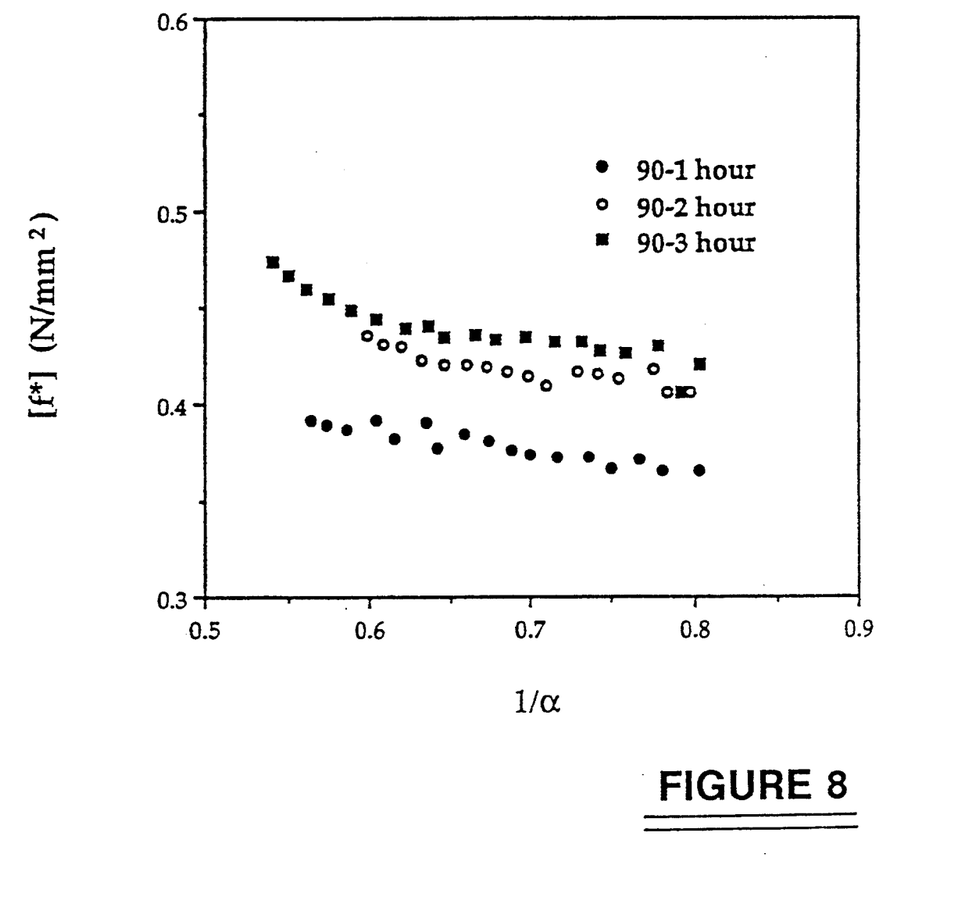
FIG. 8 shows a Mooney-Rivlin plot for a PDMS network prepared as in FIG. 3 above with 90 mol % short: chains and three different heterogeneity times of 1 hour, 2 hours, and 3 hours.

The use of a heterogeneity time for the reaction of short chain polysiloxanes with a crosslinking agent can result in a final polymer network with a significantly higher modulus as shown in FIGS. 6 and 8. The modulus increase can be 10% or more, and desirably 20% or more higher than for a traditional polysiloxane with a simple bimodal molecular weight between crosslinks.

The polysiloxane networks have utility as gaskets, sealants, caulks, coatings, and molded parts. Their physical properties such as controllable birefringence makes them suitable for strain gauges and similar uses where their birefringence is measured by optical means and either recorded or used in making a decision. Their optical clarity, toughness, and high modulus make the networks useful as elastomeric optical windows for transmitting various frequencies of light and for use in scintillation counters. One such known use is as windows in seismographic determinations for oil exploration.

EXAMPLES

Figure 1:
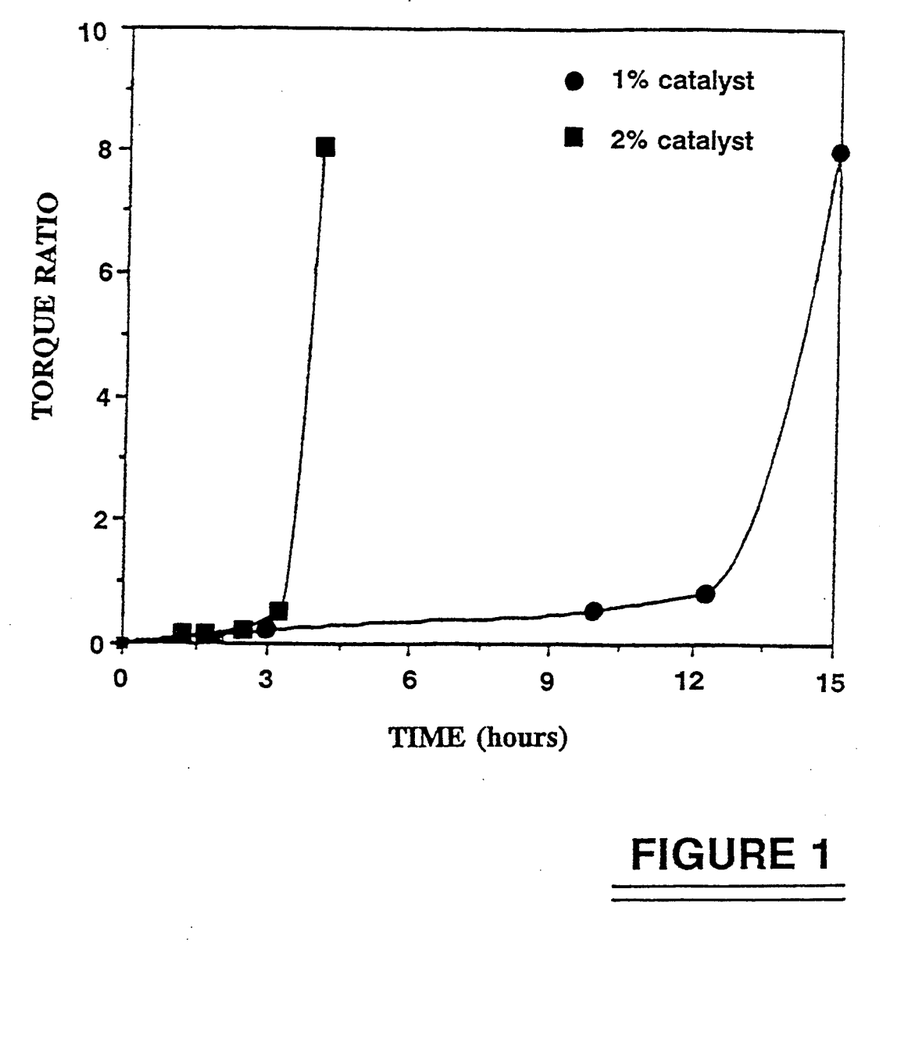
FIG. 1 shows a torque ratio as a function of mixing time for hydroxyl-terminated poly(dimethylsiloxane polymers (hydroxyl-terminated PDMS) of Mn=780 g/mole with a stoichiometric amount of crosslinker in the presence of 1 or 2 wt. % of a tin octoate (catalyst) dissolved in PDMS.

To determine the effect of heterogeneity time on the build-up of molecular weight and viscosity, a solution of 780 g/mol hydroxyl terminated PDMS chains was mixed at 25° C. with a stoichiometric amount of tetraethyl orthosilicate and either 1 or 2 wt. % of a tin octoate catalyst dissolved in PDMS. The viscosity of the solutions was followed with a Haake rotating type viscometer. This data is shown in FIG. 1.

Figure 2:
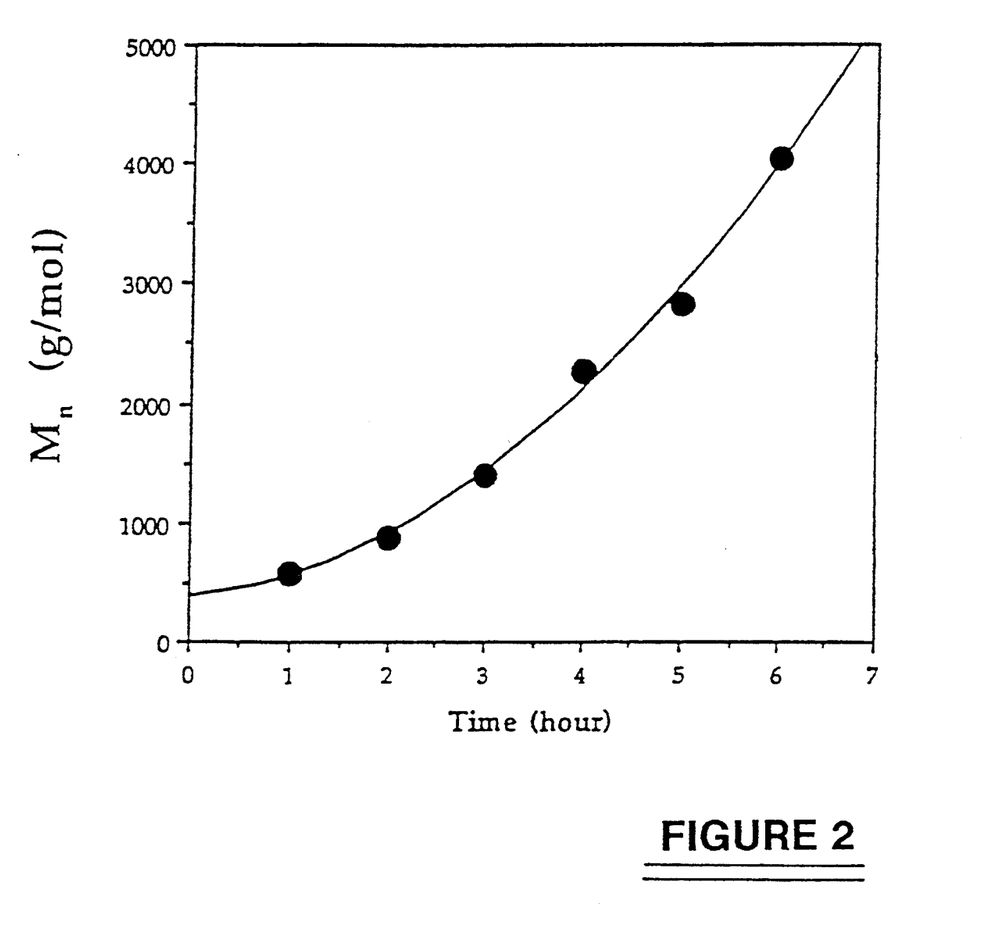
FIG. 2 shows the number average molecular weight (Mn) as a function of mixing time for the same hydroxyl-terminated PDMS and tetraethylorthosilicate crosslinker with 1 wt. % catalyst.

The build-up in molecular weight of the PDMS solution for the sample with 1 wt. % catalyst as determined by gel permeation chromatography (GPC) with a polyisobutylene standard in tetrahydrofuran is shown in FIG. 2. Based on these changes in molecular weight shown in FIG. 2, additional samples were prepared where the heterogeneity time was varied so that clusters of the low molecular weight hydroxyl terminated PDMS chains were formed prior to adding the high molecular weight hydroxyl terminated PDMS.

Figure 3:
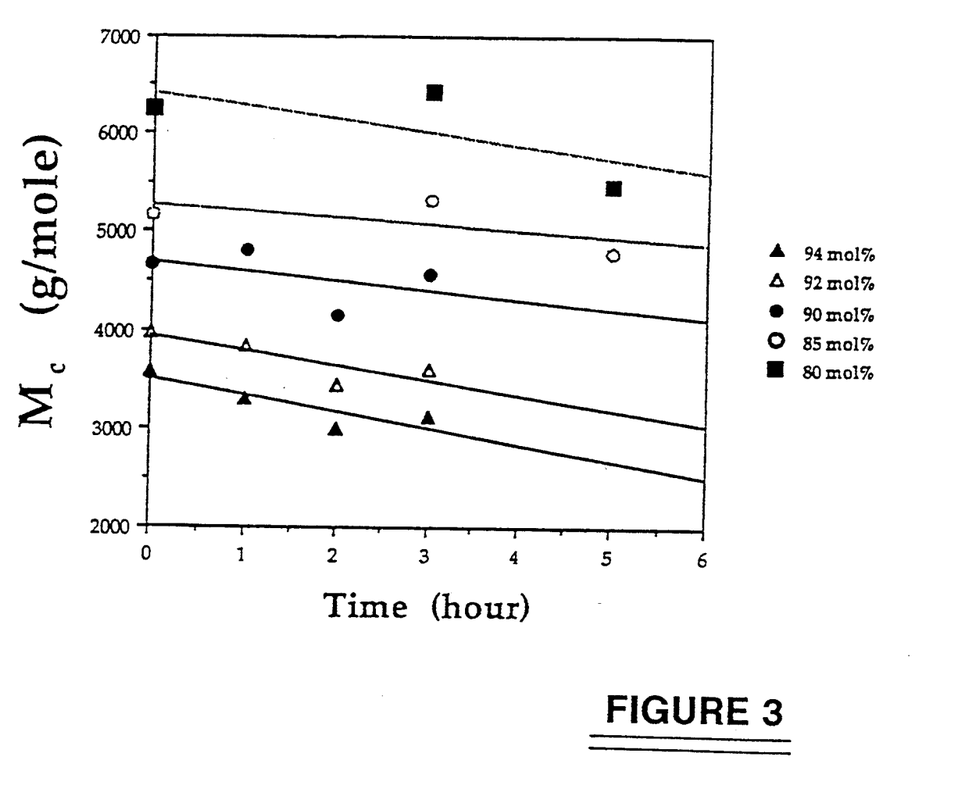
FIG. 3 shows how the apparent molecular weight between crosslinks (Mc) (as determined by swelling experiments in toluene solvent) decreases as a function of heterogeneity time for various mol % of short hydroxyl-terminated PDMS chains in blends formed from prereacting short hydroxyl-terminated with tetraethyl orthosilicate and then adding long chain hydroxyl-terminated PDMS and a stoichiometric amount of tetraethyl orthosilicate and crosslinking the reaction product. The short chains are 780 g/mole and the long chains are 17,800 g/mole.

The samples in FIG. 3 were prepared with hydroxyl terminated PDMS chains of 780 g/mol molecular weight reacted with stoichiometric equivalent amounts of tetraethyl orthosilicate and 1 wt. % catalyst for the specified heterogeneity time. Then the specified amount of 17,800 g/mol hydroxyl terminated PDMS chains of 17,800 g/mol molecular weight were added along with enough tetraethyl orthosilicate to reestablish stoichiometric equivalence of reactive groups on the polymer and on the tetraethyl orthosilicate. One wt. % catalyst was used based on the PDMS and crosslinking agent. These were mixed for 10 min. and cured at 25° C. for 24 hrs. in a circular mold having a cavity 4 inches in diameter and 1 mm deep. FIG. 3 shows how the average molecular weight as measured by swelling seems to decrease as the heterogeneity time is increased from 0 to 5 hours.

Figure 4:
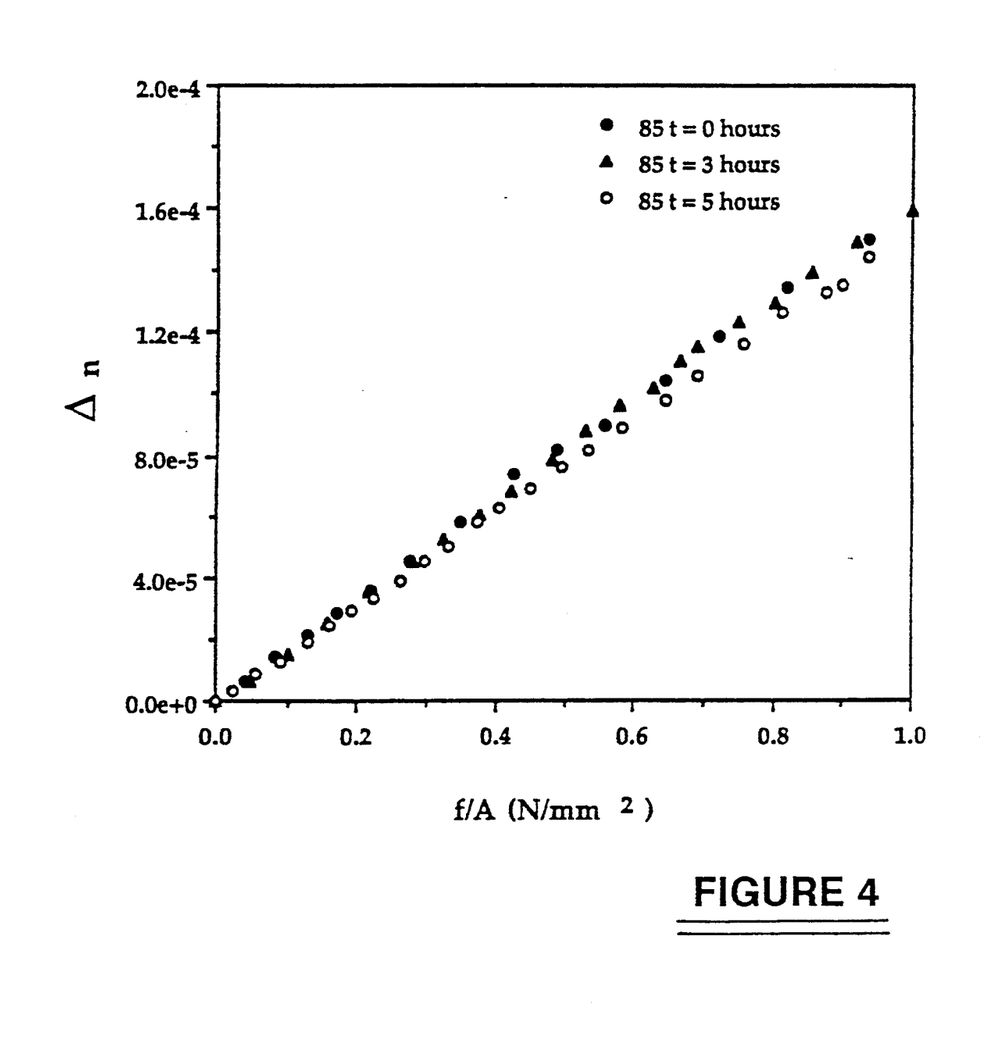
FIG. 4 shows the birefringence (Δn) as a function of true stress for PDMS networks having 80 mol % short chains prepared as described above at heterogeneity times of 0, 3 and 5 hours.

FIG. 4 shows the birefringence as a function of the true stress for networks formed 85 mol % of the 780 g/mol PDMS and 15 mol % 17,800 g/mol PDMS chain using catalyst and a tetraethyl orthosilicate crosslinking agent. The samples for birefringence were prepared from crosslinked samples after extraction to remove the sol fractions. The samples were cut to a size of 4 cm×4 mm×1 mm with markings approximately 1 cm apart to measure strain. An Instron-type bench tensile testing machine with an electronic load cell was used to measure stress. The load cell was calibrated using standard weights and was connected to a chart recorder. The strain was measured with a cathetometer. A 2mW He-Ne laser (Uniphase) in series with a polarizer (Karl Lambrecht Corporation model MGT 25E8-V632.8nm mounted in DC6), babinet compensator (Karl Lambrecht Corporation model BSC 13-1-V6328 mounted in DCG), analyzer (Karl Lambrecht Corporation, same model as the polarizer), and a photodetector (model 818-SL, Newport corporation) to which is attached a power meter (model 820, Newport Corporation) were used to measure birefringence. It can be seen from FIG. 4 that the birefringence is affected by the heterogeneity time.

Figure 5:
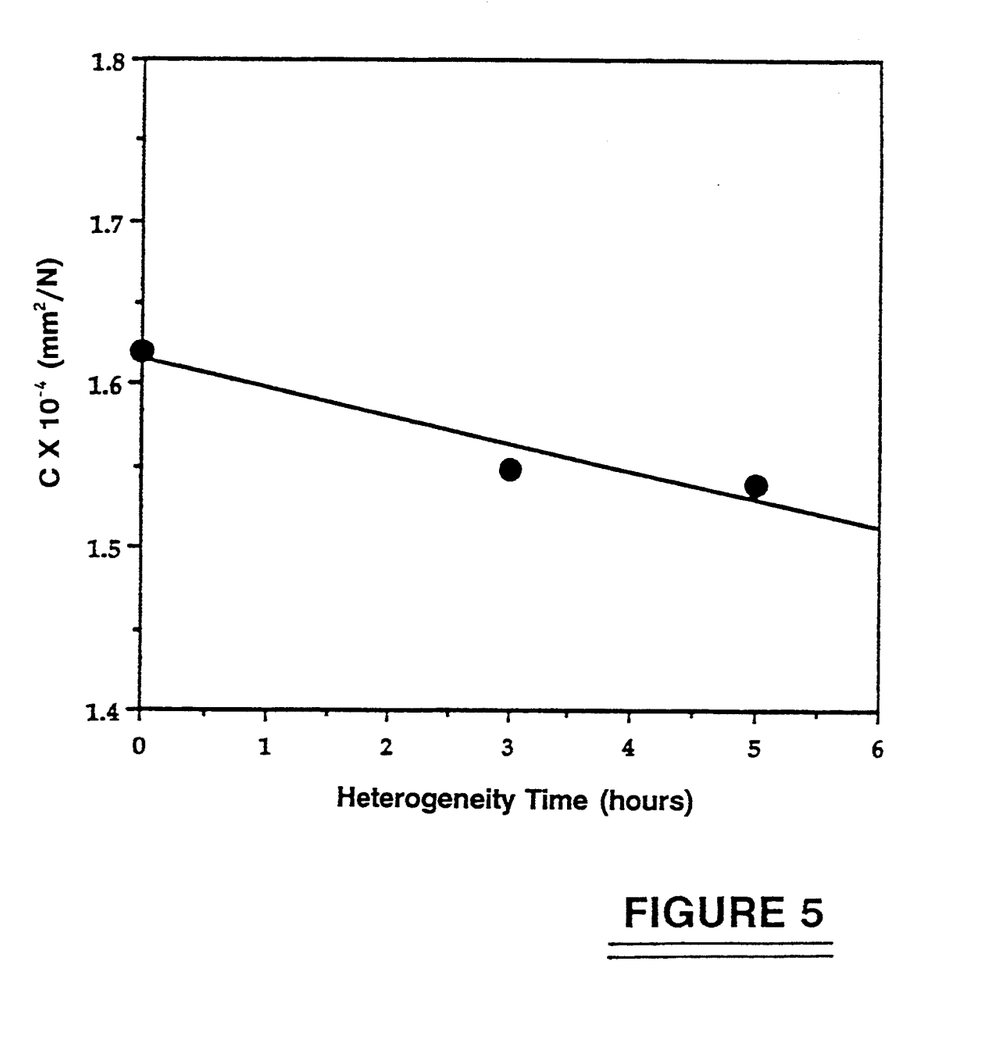
FIG. 5 shows the stress optical coefficient (C) for a PDMS network prepared as described above with 85 mol % short chains as a function of heterogeneity time.

FIG. 5 shows the variation in the stress optional coefficient as a function of heterogeneity time. The stress optical coefficient is the slope of the line in FIG. 4. It is thus the rate of change in the birefringence as a function of applied stress.

FIG. 6 shows the Mooney-Rivlin plot for samples of the same composition as FIGS. 3–5. This plot shows that the modulus (stress/strain) varies as a function of the heterogeneity time. The modulus increases as the heterogeneity time increases. Polysiloxane networks without reinforcing fillers are unsuitable for many applications due to their low modulus (soft and easily deformed). Thus, the ability to increase modulus without the addition of reinforcing fillers is very important. As can be seen in FIG. 6, with this technology, the modulus (as determined by the y-intercept of the plot) can be increased by the control of the heterogeneity time.

Figure 7:
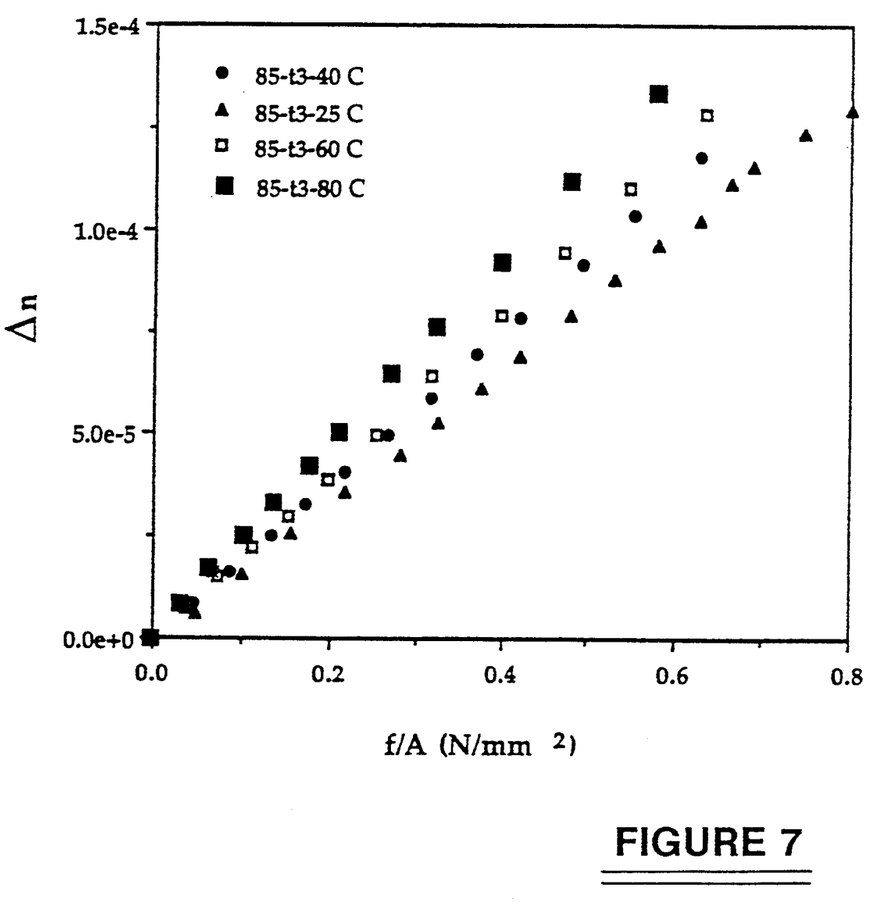
FIG. 7 shows a plot of birefringence (Δn) versus true stress (force/area in $N/mm^2$) for a PDMS network prepared as explained for FIG. 3 above with 85 mol % short chains where the temperature during the heterogeneity period of 3 hours was varied from 25° C. to 80° C.

FIG. 7 shows the variation of birefringence as a function of true stress for PDMS networks as described above with 85 mol % long chains. This figure in combination with FIG. 2 shows that it is the Mn (molecular weight) of clusters of short chains that ultimately affect birefringence. The Mn can be increased by increasing the heterogeneity time or by increasing the reaction temperature so that the catalyzed reactions proceed to a greater extent during the same reaction time.

FIG. 8 shows a Mooney Rivlin plot of where the short chains are 90 mol % of the PDMS chains and other reaction conditions were similar. This plot appears to show an even greater increase in modulus than FIG. 6 where the short PDMS chains were 85 mol %.

While in accordance with the Patent Statutes, the best mode and preferred embodiment has been set forth, the scope of the invention is not limited thereto, but rather by the scope of the attached claims.

What is claimed is:

1. A polyorganosiloxane composition comprising:
   a reaction product of
   a) 80 to 96 mole percent polyorganosiloxane short chain polymers of from about 200 to about 1,000 number average molecular weight having about 2 terminal functional groups per polymer
   b) 4 to 20 mole percent polyorganosiloxane long chain polymers of from about 4,000 to about 60,000 number average molecular weight having about 2 terminal functional groups per polymer based upon the total of said short and long chain polymers,
   c) crosslinking agent having an average functionality of above 2 when reacted with the above polymers a) and b),
   wherein the ratio of the number average molecular weight of the b) polymer to the a) polymer is from about 20 to 40,
   wherein the a) short chain polymers are prereacted with the c) crosslinking agent to form polymers having from 1.33, to 15 times the number average molecular weight of a physical blend of said short chain polymers and said crosslinking agent and that prereaction mixture is then reacted with the b) long chain polymers and more c) crosslinking agent.

2. A polyorganosiloxane composition according to claim 1, wherein the organo groups on the short chain and long chain polyorganosiloxane are individually alkyls having from 1 to 6 carbon atoms or phenyl.

3. A polyorganosiloxane composition according to claim 2, wherein the organo groups are methyl, ethyl, or phenyl.

4. A polyorganosiloxane composition according to claim 2, wherein the molecular weight of the prereacted short chain polymers and said crosslinking agents is a number average molecular weight of from 2 to 10 times the number average molecular weight of a physical blend of said short chain polymers and said crosslinking agent, and wherein the functional groups are hydroxyl or alkoxy groups.

5. A polyorganosiloxane composition according to claim 2, wherein the mole percent short chain polymers are from 85 to 95, and the mole percent long chain polymers are from 5 to 15 based on the total of said short and long chain polymers.

6. A polyorganosiloxane composition according to claim 4, wherein the mole percent short chain polymers is from 85 to 95, and the mole percent long chain polymers is from 5 to 15 based on the total of said short and long chain polymers.

7. A polyorganosiloxane composition according to claim 1, wherein one or more of the polyorganosiloxane polymers has pendant or backbone mesogenic groups capable of crystallization.

8. A polyorganosiloxane composition according to claim 2, wherein the composition is molded into a crosslinked article.

9. A polyorganosiloxane composition according to claim 8 molded into an optically transparent window.

10. A polyorganosiloxane composition according to claim 8, wherein the length of time of the prereaction is called a heterogeneity time, and wherein the heterogeneity time is adjusted to give a particular birefringence value or stress optical coefficient.

11. A polyorganosiloxane composition according to claim 8 molded into a stress or strain gauge or strain indicator.

12. A polyorganosiloxane composition according to claim 1, wherein the organo groups are individually methyl, ethyl, or phenyl; wherein the mole % short chains is from 87 to 93 and the mole % long chains is from 7 to 13; wherein the functional groups of the polyorganosiloxanes are hydroxyl groups; and wherein a catalyst is used.

13. A process for increasing the modulus of a polyorganosiloxane network, having bimodal molecular weight between crosslinks comprising:
   a) prereacting functionally terminated short chain polyorganosiloxane polymers with a polyfunctional crosslinking agent forming a prereaction mixture of polymers having number average molecular weights from 1.33 to 15 times the number average molecular weight of the physical blend of said short chain polymers and said crosslinking agent,
   b) reacting the prereaction mixture with functionally terminated long chain polyorganosiloxane polymers and additional crosslinking agent forming a crosslinked network, wherein the short chain polymers have number average molecular weights from about 200 to 1,000 which molecular weights are 1/40 to 1/20 of the number average molecular weight of the long chain polyorganosiloxane polymers.

14. A process according to claim 13, wherein the organo groups of the polyorganosiloxane are individually methyl, ethyl, or phenyl; wherein the terminal functional groups are hydroxyl, and wherein the functional groups of the crosslinking agent are reactive with hydroxyl groups.

15. A process for controlling the stress optical coefficient of a polyorganosiloxane network having a bimodal molecular weight between crosslinks comprising;
   a) prereacting functionally terminated short chain polyorganosiloxane polymers with a polyfunctional crosslinking agent forming a prereaction mixture of polymers having number average molecular weights from 1.33 to 15 times the number average molecular weight of the starting materials,
   b) reacting the prereaction mixture with functionally terminated long chain polyorganosiloxane polymers and additional crosslinking agent forming a crosslinked network, wherein the short chain polymers have number average molecular weights from about 200 to 1,000 which molecular weights are 1/40 to 1/20 of the number average molecular weight of the long chain polyorganosiloxane polymers.

16. A process according to claim 15, wherein the organo groups of the polyorganosiloxane are individually methyl, ethyl, or phenyl; wherein the terminal functional groups are hydroxyl groups, and wherein the crosslinking agent is reactive with said hydroxyl groups.

* * * * *